United States Patent

[11] 3,614,140

| [72] | Inventor | Leonard R. Nestor<br>Saint Paul, Minn. |
|---|---|---|
| [21] | Appl. No. | 852,322 |
| [22] | Filed | Aug. 22, 1969 |
| [45] | Patented | Oct. 19, 1971 |
| [73] | Assignee | Minnesota Mining and Manufacturing Company<br>Saint Paul, Minn. |

[54] GRIPPING DEVICE AND METHOD OF MAKING
11 Claims, 7 Drawing Figs.

[52] U.S. Cl. ................................................ 287/52.06,
24/136.3
[51] Int. Cl. ................................................ F16d 1/06
[50] Field of Search ................................... 287/52.06,
116, 52.04; 279/1 R, 46, 53; 24/136.3

[56] References Cited
UNITED STATES PATENTS

| 165,546 | 7/1875 | Cook | 287/52.06 X |
|---|---|---|---|
| 929,851 | 8/1909 | Hess | 287/52.06 X |
| 1,655,734 | 1/1928 | McWilliams | 24/136.3 |
| 2,346,706 | 4/1944 | Stoner | 279/46 |
| 2,493,556 | 1/1950 | Stone | 24/136.3 X |
| 2,699,589 | 1/1955 | Redell | 287/116 X |
| 2,746,758 | 5/1956 | Stoner et al. | 279/53 |

*Primary Examiner*—Thomas F. Callaghan
*Assistant Examiner*—Andrew V. Kundrat
*Attorney*—Kinney, Alexander, Sell, Steldt & Delahunt

ABSTRACT: A gripping device useful in mounting a wheel on a shaft and for other purposes comprising a ringlike array of resiliently interconnected platelike wedge-shaped blades having slotted end extensions, in combination with a thrust ring for applying force to said array at said extensions and in an axial direction.

PATENTED OCT 19 1971

3,614,140

INVENTOR.
LEONARD R. NESTOR
BY Kinney, Alexander,
Sell, Steldt & DeLaHunt
ATTORNEYS

GRIPPING DEVICE AND METHOD OF MAKING

This invention relates to gripping devices. In one important aspect the invention relates to devices for mounting a wheel or other rotary object on a shaft or axle. In another aspect the invention relates to devices for attaching a shaft to another similar shaft in axial end-to-end alignment within an outer retaining sleeve. Other aspects of the invention will be made apparent as the description proceeds.

Stoner U.S. Pat. No. 2,346,706 describes a gripping device in the form of a collet, containing a number of angularly spaced rigid gripping members held together with intervening rubbery composition and fitting within a conical shell. An end cap making screw connection with the threaded exterior of the shell forces the collet into the conical interior to drive the wedge-shaped plates radially inwardly against a shaft or other workpiece. A compression spring within the smaller end of the shell serves to release the collet when the screwcap is loosened.

It has now been found possible to obtain equally effective gripping action without requiring the provision of a screw thread or other force-applying means on the conical shell. As a result it becomes possible to provide a simplified assembly which may be employed in any suitably apertured shell, wheel, gear, shaft, housing, armature or other component, e.g. to impart effective gripping action on an inserted shaft, rod or similar workpiece, or to assemble two shafts or the like in axial relationship, and with such workpiece accurately centered within the aperture.

In accordance with the invention, these and other advantageous results are obtained by lengthening or extending the wedge-shaped gripping members, slotting the extended portions to define a circumferential slot area, and disposing at said slot area a thrust ring member, if necessary together with additional thrust-imparting members, all as will now be further described and illustrated in connection with the appended nonlimiting drawings, in which FIG. 1 is a side elevation in section taken approximately at line 1—1 of FIG. 2, FIG. 2 is a partial rear elevation in section taken approximately at line 2—2 of FIG. 1., and FIG. 3 is a partial front elevation in section taken approximately at line 3—3 of FIG. 1, of one form of the invention as applied to a wheel and axle;

Figure 1:
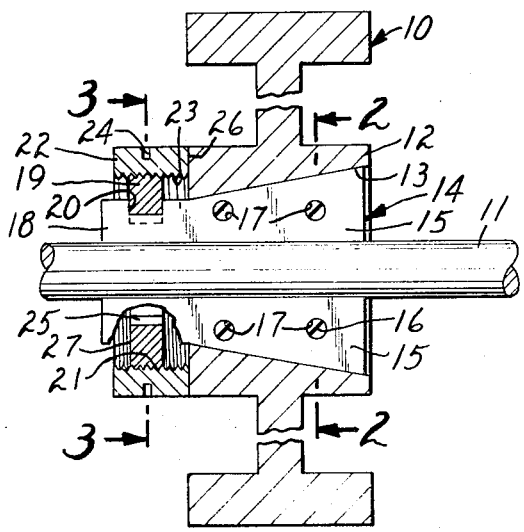
Figure 2:
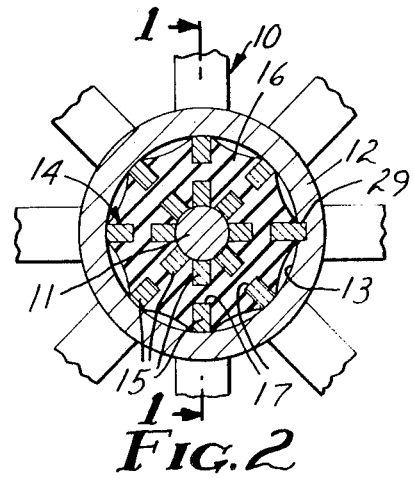
Figure 3:
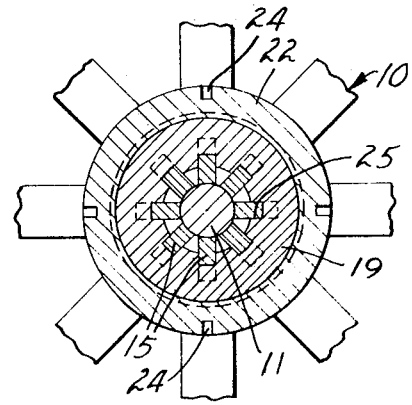

FIGS. 1–3 show the application of the device as a gripping means between a wheel 10 and an axle 11. The hub 12 of the wheel has a conical inner surface 13 concentric with the axis. The gripping device, generally indicated at 14, comprises a ringlike array of uniformly spaced flat wedge-shaped blades 15 resiliently interconnected by means of a rubbery polymer 16 separating the blades and passing through apertures 17 therein. To this extent the ringlike array will be seen to be substantially as shown in the Stoner U.S. Pat. No. 2,346,706.

In accordance with the present invention and as further illustrated in FIGS. 1–3 each of the blades 15 is further provided with a slotted axial extension 18 and the assembly includes a thrust ring 19 which bears against the slot-defining edges 20. The ring 19 is threaded over its outer circumference with continuous screw threads 21 and is enclosed within an outer second ring or collar 22 which is provided on its inner circumference with a corresponding continuous screw thread 23. The outer ring 22 is rotatable, e.g. by means of a spanner having points fitting within appropriate apertures 24 provided in the outer circumference of the ring, or by other appropriate means. Rotation of the inner ring 19 relative to the blades 15 is prevented by providing blade-receiving slots 25 parallel to the axis and extending along the inner circumference of said ring 19. The assembly may also be keyed to the hub 12, e.g. at keyway 29, if desired, one of the blades 15 being widened for the purpose as shown in FIG. 2.

As the ring 22 is rotated, its inner edge 26 presses against the edge of the hub 12, and the outer edge 27 of the ring 19 presses against the outer slot-defining edges 20. The wedges 15 are thereby drawn into, and against the inner conical surface 13 of, the hub 12 and into gripping contact with the surface of the shaft 11. The resilient rubbery filler 16 permits such motion of the blades 15 while still serving to hold the blades together when not thus confined. The shaft is accurately centered within the conical bore, and the shaft and wheel are firmly and immovably held together.

By eliminating the spokes and rim of the wheel 10, the hub 12 serves as an outer retaining sleeve for the gripping device 14 which may thus serve to grip a pair of shafts, or a shaft and a drill or other tool of the same diameter, in end-to-end alignment.

Figure 4:
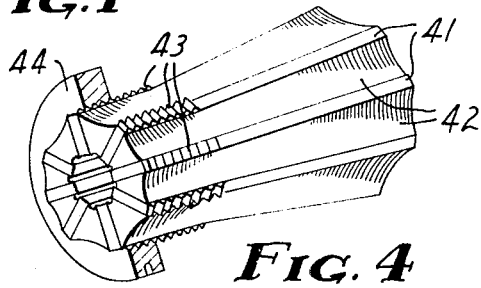
FIG. 4 is a modified and simplified form of the ringlike array and thrust ring member of FIGS. 1–3 shown in perspective and partly cut away.

Similar holding action is achieved with the modification shown in FIG. 4 when analogously applied. In this modification the wedge-shaped and axially extended blades 41 are resiliently interconnected with an adherently bonded series of rubbery segments 42. The axially extended ends of the blades 41 are slotted across the outer edges to provide slots 43 defining a discontinuous screw thread. The ring 44 is correspondingly threaded around its inner circumference to mate with the threads defined by the slots 43. When installed within a conical shell or hub opening and over a cylindrical shaft, tightening of the ring 44 against the adjacent edge of the shell produces the same gripping effect as described in conjunction with the structure of FIGS. 1–3.

Figure 5:
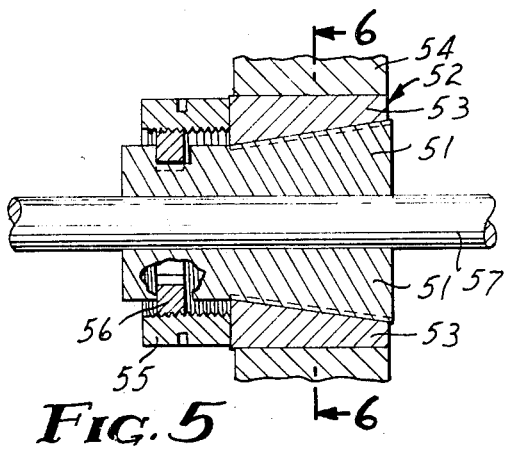
FIGS. 5 and 6 are sectional side elevation and rear elevation respectively, taken along the lines indicated, of another modification of the invention.
Figure 6:
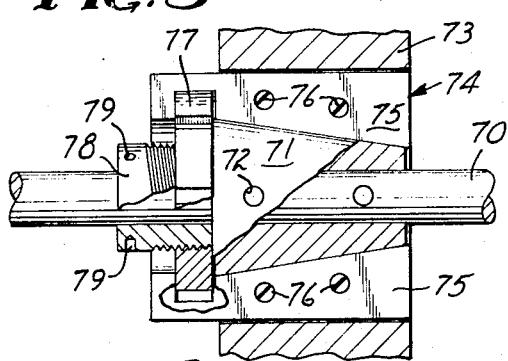

Still another modification is illustrated in FIGS. 5 and 6, wherein the ringlike array of uniformly spaced resiliently interconnected wedge-shaped blades 51 is enclosed within a conical outer shell 52 formed of similarly resiliently interconnected reversely wedge-shaped blades 53 the outer edges of which define a cylindrical envelope fitting within the cylindrical bore of hub 54. As more particularly illustrated in FIG. 6, the outer edges of the blades 51 and the inner edges of the blades 53 form interengaging ridges and grooves to assist in maintaining the blades in edge-to-edge contact. Force applied between the inner blades 51 and the outer blades 53 by rotation of the inwardly threaded outer ring 55 against the nonrotating outwardly threaded inner thrust ring 56 forces the blades 53 against the inner surface of the hub 54 and the inner edges of blades 51 against the outer surface of shaft 57, the two sets of blades sliding against each other for the purpose.

Figure 7:
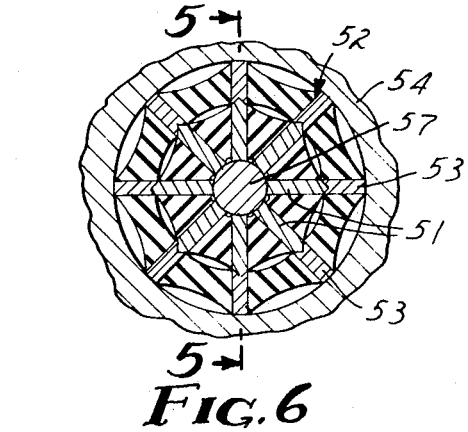
FIG. 7 is a side elevation, partially in section, of another modified form of the invention.

FIG. 7 illustrates a further modification of the invention. A conical sleeve 71 is secured to the cylindrical shaft 70, e.g. by rivets 72. Between the conical outer surface of the sleeve 71 and the inner cylindrical surface of the hub 73 there is disposed a ringlike array 74 of axially extended radial blades 75 interconnected by a body of resilient material 76. An internally circumferentially threaded and outwardly paraxially grooved thrust ring 77 fits within grooves formed in the axial extensions of blades 75 and over an externally circumferentially threaded collar or second ring member 78 having apertures 79 for application of a spanner. Rotation of inner collar 78 in contact with the end of the sleeve 71 forces the outer ring 77 against the outer groove-defining edges of the blades 75 and forces the blades into gripping contact with the cone and hub.

Structures such as those specifically illustrated, and wherein the exposed edges of the wedge-shaped blades define both a cylindrical and a conical surface, are readily applied to a variety of structures and will generally be preferred. However it will be apparent that an array of blades defining two conical surfaces of opposite or of unequal slope is also effective. The required thrust may be applied to the thrust ring member and thence against the blade members by means of levers or pistons rather than by screw action; the wedge-shaped blades may have a wedge-shaped rather than rectangular lateral cross section, and may be tilted rather than radially disposed; the contacting edges of the blades may be hollow ground or otherwise altered to provide improved gripping characteristics. Various other modifications will be readily apparent or will be suggested by the disclosure hereof and are contemplated as coming within the scope of the appended claims.

What is claimed is as follows:

1. In combination, a ringlike array of angularly spaced resiliently interconnected wedge-shaped blades with exposed inner and outer edges, said blades having slotted axial extensions defining a circumferential slot area, and a paraxially grooved thrust ring contacting the slot-defining edges of said blade extensions for applying axial thrust thereto, said blade extensions fitting into the paraxial grooves in said ring for preventing relative rotation between said array and said ring.

2. The combination of claim 1 wherein said thrust ring carries a circumferential screw thread.

3. The combination of claim 2 wherein said screw thread is at the inner circumference of said ring.

4. The combination of claim 2 including a second circumferentially threaded ring member threadably engaged with said thrust ring.

5. The combination of claim 4 wherein said thrust ring is exteriorly threaded and said second ring member is interiorly correspondingly threaded.

6. The combination of claim 4 wherein said thrust ring is interiorly threaded and said second ring member is exteriorly correspondingly threaded.

7. A wheel-and-axle assembly wherein said wheel is rigidly mounted on said axle by an intervening combination of blade array and thrust ring as defined in claim 1.

8. A shaft assembly wherein two shafts are rigidly assembled in end-to-end aligned relationship within a combination of blade array and thrust ring as defined in claim 1 and contained within an outer retaining sleeve.

9. The combination of claim 2 wherein said screw thread is at the outer circumference of said ring.

10. The combination of claim 1 wherein the wedge-shaped blades are disposed around a central member and within an encircling member, the surface of said members having different slopes along the axis and conforming to the inner and outer edges of said blades.

11. The combination of claim 4 wherein the wedge-shaped blades are disposed around a central member and within an encircling member, the surfaces of said members having different slopes along the axis and conforming to the inner and outer edges of said blades, and said second ring being rotatively engageable with an end of one of said members for imparting axial thrust to said thrust ring.